United States Patent [19]

O'Kane et al.

[11] Patent Number: 5,615,920
[45] Date of Patent: Apr. 1, 1997

[54] ILLUMINATED MAGNETIC PICKUP TOOL

[76] Inventors: John B. O'Kane, 238 Jefferson St., Belmont Hills; Phillip S. Geary, 10 Montgomery Ave., Apt. D-4, Bala Cynwyd, both of Pa. 19004

[21] Appl. No.: 498,976

[22] Filed: Jul. 6, 1995

[51] Int. Cl.⁶ .................................................. B25J 15/06
[52] U.S. Cl. ............................................................. 294/65.5
[58] Field of Search ................................. 294/19.1, 64.1, 294/65.5, 66.2, 100; 135/910; 335/285, 291, 293, 294; 362/102, 109, 119, 120, 398

[56] References Cited

U.S. PATENT DOCUMENTS

| | | | |
|---|---|---|---|
| 2,683,618 | 7/1954 | Long | 294/65.5 |
| 3,582,638 | 6/1971 | Peters | 294/65.5 X |
| 3,924,115 | 12/1975 | Hampton et al. | 294/65.5 X |
| 4,253,697 | 3/1981 | Acosta | 294/65.5 X |
| 4,575,143 | 3/1986 | Nast | 294/65.5 |
| 5,261,714 | 11/1993 | Slusar et al. | 294/65.5 |
| 5,348,359 | 9/1994 | Boozer | 294/65.5 X |
| 5,381,319 | 1/1995 | Shiao | 294/65.5 X |

FOREIGN PATENT DOCUMENTS 30203  of 1911  United Kingdom ............... 294/65.5

*Primary Examiner*—Johnny D. Cherry

[57] ABSTRACT

A tool for illuminating and magnetically coupling with an object. The inventive device includes a handle having an elongated stanchion projecting therefrom. An illuminated magnetic attraction assembly is mounted to an end of the stanchion and can be utilized to retrieve ferrous objects from confined spaces.

1 Claim, 3 Drawing Sheets

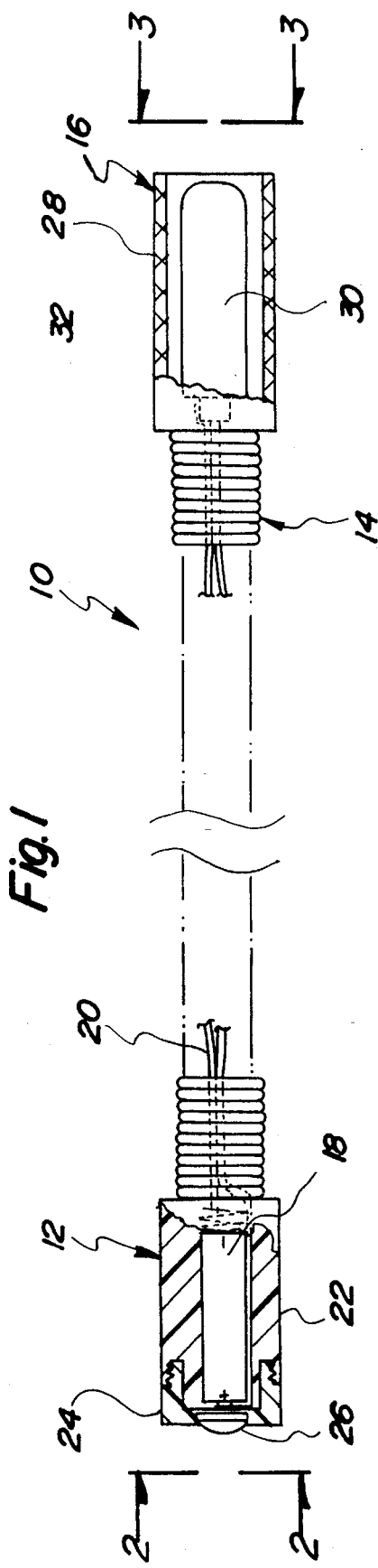
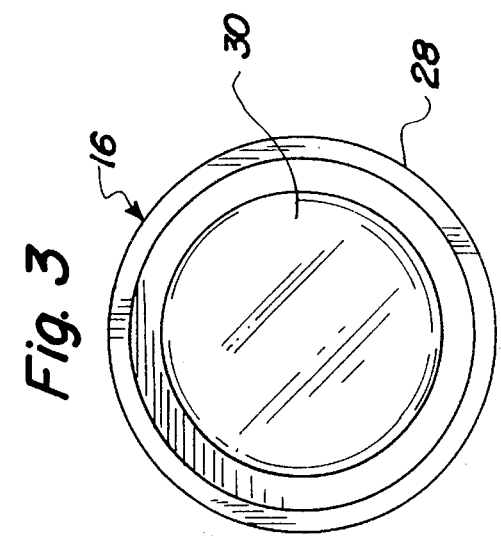
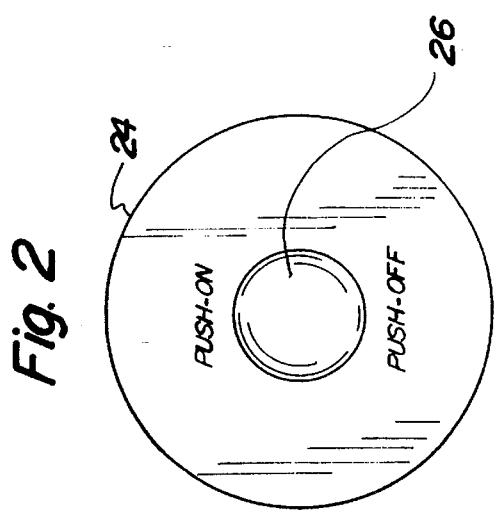

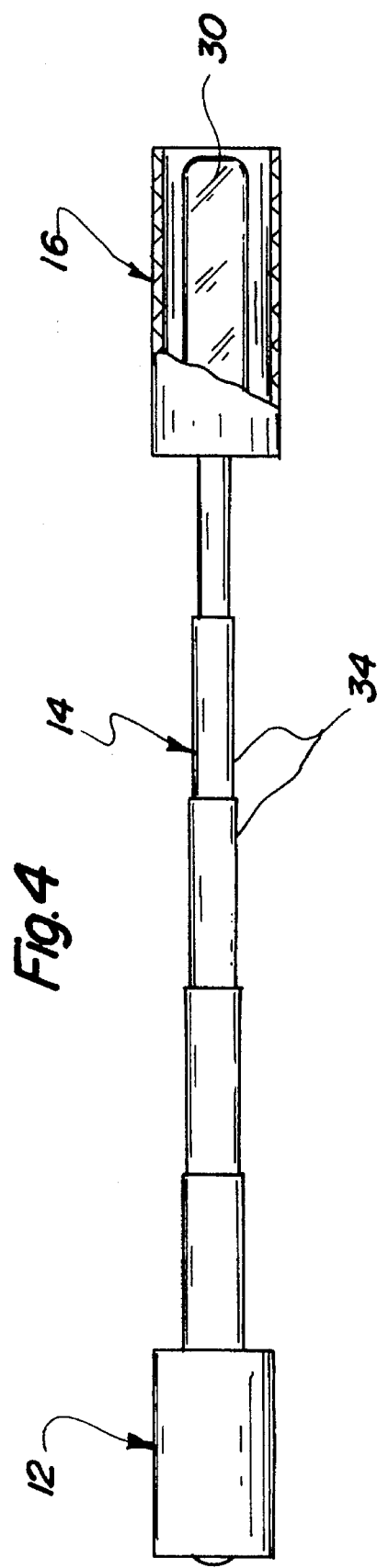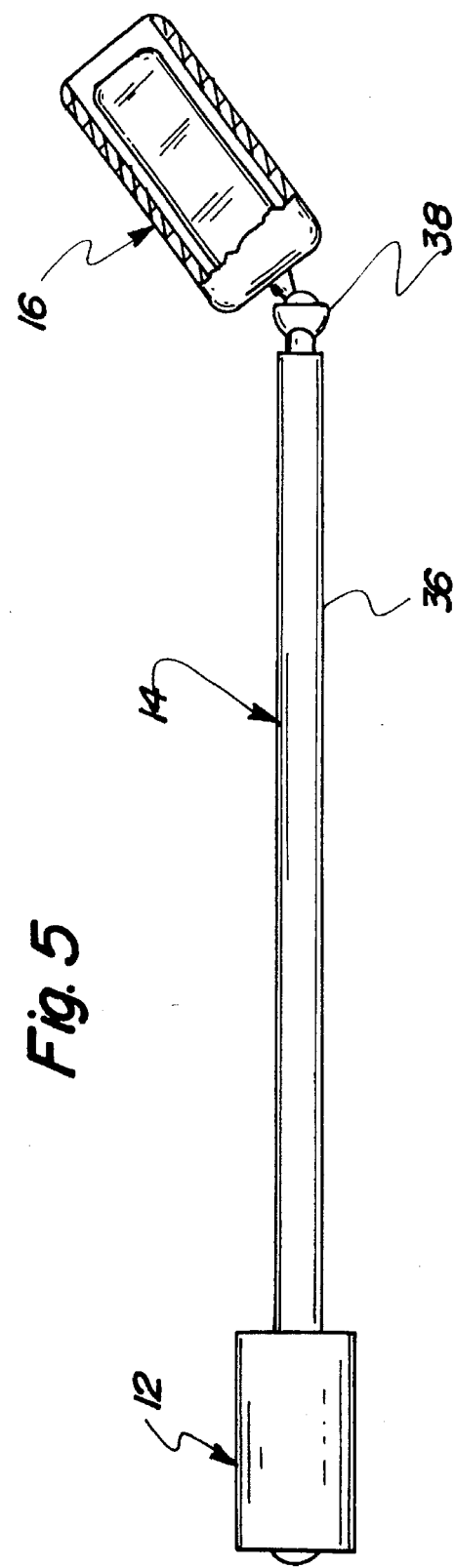

ILLUMINATED MAGNETIC PICKUP TOOL

BACKGROUND OF THE INVENTION

1. Field of the Invention

The present invention relates to magnetic grappling devices and more particularly pertains to an illuminated magnetic pickup tool for illuminating and magnetically coupling with an object.

2. Description of the Prior Art

The use of magnetic grappling devices is known in the prior art. More specifically, magnetic grappling devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art magnetic grappling devices include U.S. Pat. No. 5,265,887; U.S. Pat. No. 5,348,359; U.S. Pat. No. 3,924,115; U.S. Pat. No. 5,261,714; U.S. Pat. No. 4,962,957; and U.S. Design Pat. No. 346,625.

While these devices fulfill their respective, particular objectives and requirements, the aforementioned patents do not disclose an illuminated magnetic pickup tool for illuminating and magnetically coupling with an object which includes a handle having an elongated stanchion projecting therefrom, and an illuminated magnetic attraction assembly mounted to an end of the stanchion which can be utilized to retrieve ferrous objects from confined spaces.

In these respects, the illuminated magnetic pickup tool according to the present invention substantially departs from the conventional concepts and designs of the prior art, and in so doing provides an apparatus primarily developed for the purpose of illuminating and magnetically coupling with an object.

SUMMARY OF THE INVENTION

In view of the foregoing disadvantages inherent in the known types of magnetic grappling devices now present in the prior art, the present invention provides a new illuminated magnetic pickup tool construction wherein the same can be utilized for retrieving a ferrous object from a confined space. As such, the general purpose of the present invention, which will be described subsequently in greater detail, is to provide a new illuminated magnetic pickup tool apparatus and method which has many of the advantages of the magnetic grappling devices mentioned heretofore and many novel features that result in an illuminated magnetic pickup tool which is not anticipated, rendered obvious, suggested, or even implied by any of the prior art magnetic grappling devices, either alone or in any combination thereof.

To attain this, the present invention generally comprises a tool for illuminating and magnetically coupling with an object. The inventive device includes a handle having an elongated stanchion projecting therefrom. An illuminated magnetic attraction assembly is mounted to an end of the stanchion and can be utilized to retrieve ferrous objects from confined spaces.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new illuminated magnetic pickup tool apparatus and method which has many of the advantages of the magnetic grappling devices mentioned heretofore and many novel features that result in an illuminated magnetic pickup tool which is not anticipated, rendered obvious, suggested, or even implied by any of the prior art magnetic grappling devices, either alone or in any combination thereof.

It is another object of the present invention to provide a new illuminated magnetic pickup tool which may be easily and efficiently manufactured and marketed.

It is a further object of the present invention to provide a new illuminated magnetic pickup tool which is of a durable and reliable construction.

An even further object of the present invention is to provide a new illuminated magnetic pickup tool which is susceptible of a low cost of manufacture with regard to both materials and labor, and which accordingly is then susceptible of low prices of sale to the consuming public, thereby making such illuminated magnetic pickup tools economically available to the buying public.

Still yet another object of the present invention is to provide a new illuminated magnetic pickup tool which provides in the apparatuses and methods of the prior art some of the advantages thereof, while simultaneously overcoming some of the disadvantages normally associated therewith.

Still another object of the present invention is to provide a new illuminated magnetic pickup tool for illuminating and magnetically coupling with an object.

Yet another object of the present invention is to provide a new illuminated magnetic pickup tool which includes a handle having an elongated stanchion projecting therefrom, and an illuminated magnetic attraction assembly mounted to an end of the stanchion which can be utilized to retrieve ferrous objects from confined spaces.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an elevation view of an illuminated magnetic pickup tool according to the present invention.

FIG. 2 is an end elevation view taken from line 2—2 of FIG. 1.

FIG. 3 is an end elevation view taken from line 3—3 of FIG. 1.

FIG. 4 is an elevation view of the invention including an alternative form of an elongated stanchion thereof.

FIG. 5 is an elevation view of the invention including a further alternative form of the elongated stanchion.

DESCRIPTION OF THE PREFERRED EMBODIMENT

Figure 6:
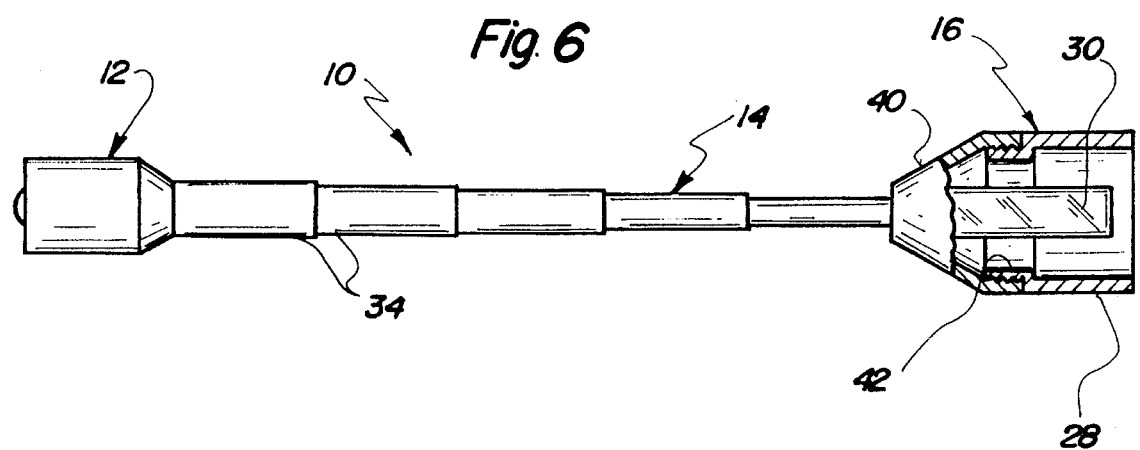
FIG. 6 is an elevation view of the invention including an alternative form of an illuminated magnetic attraction means of the invention.

With reference now to the drawings, and in particular to FIGS. 1–7 thereof, a new illuminated magnetic pickup tool embodying the principles and concepts of the present invention and generally designated by the reference numeral 10 will be described.

More specifically, it will be noted that the illuminated magnetic pickup tool 10 comprises a handle means 12 for being grasped and manipulated by an individual during use of the device 10. An elongated stanchion 14 projects from the handle means 12 and terminates in a free distal end spaced therefrom. An illuminated magnetic attraction means 16 is coupled to the free distal end of the elongated stanchion 14 for illuminating and magnetically coupling with an object. By this structure, an individual may utilize the present invention 10 for retrieving a ferrous object from a confined space such as an engine compartment or engine of a motor vehicle.

Referring now to FIGS. 1 through 3 wherein the present invention 10 is illustrated in detail, it can be shown that the handle means 12 operates to receive and support a battery 18 which electrically communicates with the illuminated magnetic attraction means 16 through a plurality of wires 20 extending through the elongated stanchion 14. To this end, the handle means 12 preferably comprises a hollow handle body 22 within which a battery 18 can be positioned and electrically coupled to the wires 20. A removable cap 24 is threadably or otherwise removably coupled to the handle body 22 and supports a switch 26 in electrical communication with the wires 20. The switch 26 is of a conventionally known construction and can be utilized to effect selective coupling of the wires 20 to a battery 18 positioned within the handle means 12. By this structure, an operation of the illuminated magnetic attraction means 16 can be selectively accomplished through a manual actuation of the switch 26 in association with the battery 18.

As shown in FIGS. 1 and 3, the illuminated magnetic attraction means 16 of the present invention 10 preferably comprises a cylindrical magnet 28 secured to the free distal end of the elongated stanchion 14. A light bulb 30 is mounted within the cylindrical magnet 28 and positioned in electrical communication with the wires 20 extending through the elongated stanchion 14. By this structure, an actuation of the switch 26 will effect energization of the light bulb 30 so as to illuminate an object residing in front of the illuminated magnetic attraction means 16, with the cylindrical magnet 28 being operable to effect magnetic coupling of the object to the device 10.

As shown in FIG. 1, the elongated stanchion 14 may take the form of a coil spring 32 which projects from the handle means 12 and couples with the illuminated magnetic attraction means 16. The coil spring 32 can be constructed of a resilient spring steel or the like permitting resilient articulation of the elongated stanchion 14 about objects and/or obstructions. Alternatively, the coil spring 32 can be formed of a substantially ductile material permitting selective deformation of the elongated stanchion 14 in a desired shape, whereby such shape is then retained by the ductile nature of the material of the coil spring 32.

As shown in FIG. 4, the elongated stanchion 14 may alternatively comprise a plurality of telescoping sections 34 which are telescopingly received within one another and frictionally retained relative to one another. The telescoping sections 34 of the elongated stanchion 14 project from the handle means 12 and couple with the illuminated magnetic attraction means 16 as shown in FIG. 4. By this structure, the telescoping sections 34 can be slidably adjusted relative to one another so as to position the elongated stanchion 14 at a desired length, whereby the frictional engagement of the telescoping sections 34 with one another retains such position of elongated stanchion 14.

As shown in FIG. 5, the elongated stanchion 14 may further alternatively comprise a hollow rod 36 of a fixed predetermined length which extends from the handle means 12 and couples with the illuminated magnetic attraction means In this alternative form of the present invention illustrated in FIG. 5, it is preferable that the invention further comprises a ball joint 38 interposed between a free distal end of the hollow rod 36 of the elongated stanchion and the illuminated magnetic attraction means 16 so as to permit selective articulation of the illuminated magnetic attraction means as desired relative to the elongated stanchion 14.

Figure 7:
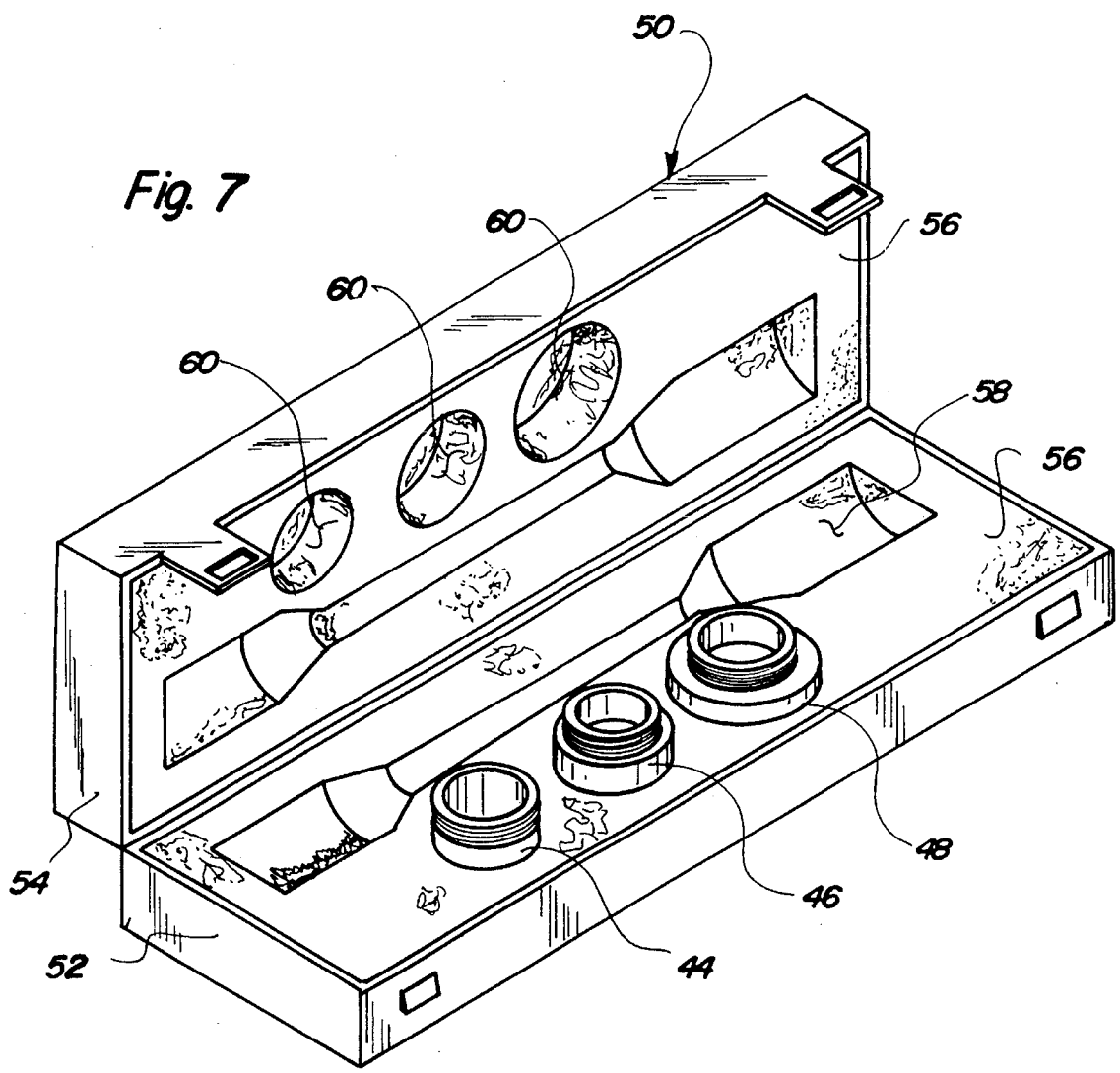
FIG. 7 is an isometric illustration of a carrying case for use with the present invention.

As shown in FIG. 6, the illuminated magnetic attraction means 16 may further comprise a mounting head 40 interposed between the free distal end of the elongated stanchion 14 and the cylindrical magnet 28. In this alternative form of the present invention 10 illustrated in FIG. 6, the cylindrical magnet 28 is preferably provided with a threaded neck 42 projecting therefrom so as to removably couple the cylindrical magnet 28 to the mounting head 40. By this structure, cylindrical magnets 28 of varying diameters can be selectively coupled to the mounting head 40 as desired by an end user. As shown in FIG. 7, a variety of cylindrical magnets 28 can include a first cylindrical magnet 44 having a first diameter, a second cylindrical magnet 46 having a second diameter, and a third cylindrical magnet 48 having a third diameter, wherein the second diameter is substantially greater than the first diameter, with the third diameter being substantially greater than the second diameter so as to provide a plurality of cylindrical magnets 28 of disparate diameters. It should be noted that the threaded neck 42 of each of the cylindrical magnets 44,46,48 is of a fixed diameter so as to be cooperable with the mounting head 40 as shown in FIG. 6.

With continuing reference to FIG. 7, it can be shown that the present invention 10 may further comprise a carrying case 50 for receiving and enclosing the illuminated magnetic pickup tool 10 in a convenient and organized manner. To this end, the carrying case 50 comprises a lower portion 52 and an upper portion 54 pivotally mounted relative to the lower portion. A pair of cooperatively configured foam inserts 56 are positioned within the portions 52 and 54 of the carrying case 50. Each of the foam inserts 56 is shaped so as to define a tool cavity 58 directed thereinto which receives the illuminated magnetic pickup tool 10 in an assembled configuration as illustrated in FIG. 6 of the drawings. Further, the foam inserts 56 are shaped so as to define a plurality of magnet cavities 60 which cooperatively receive the cylindrical magnets 44,46,48.

In use, the illuminated magnetic pickup tool of the present invention can be easily utilized for illuminating and retrieving ferrous or other magnetically attracted objects from confined spaces such as commonly occurs within an engine compartment or engine of a conventionally known automobile.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An illuminated magnetic pickup tool comprising:

a handle means for being grasped and manipulated by an individual;

an elongated stanchion projecting from the handle means and terminating in a free distal end spaced therefrom;

an illuminated magnetic attraction means coupled to the free distal end if the elongated stanchion for illuminating and magnetically coupling with an object, the handle means operating to receive and support a battery which can be electrically communicated with the illuminated magnetic attraction means, the handle means comprising a hollow handle body within which a battery can be positioned and electrically coupled to the illuminated magnetic attraction means;

a removable cap threadedly coupled to the handle body;

a switch mounted relative to the handle body and positioned in electrical communication with the illuminated magnetic attraction means, the illuminated magnetic attraction means comprising a cylindrical magnet secured to a free distal end of the elongated stanchion, the elongated stanchion comprising a coil spring projecting from the handle means and coupling with the illuminated magnetic attraction means, the coil spring being formed of a substantially ductile material permitting selective deformation of the elongated stanchion into a desired shape, whereby the shape is then retained by the ductile material of the coil spring;

a light bulb mounted within the cylindrical magnet and positioned in electrical communication with the switch.

* * * * *